(12) United States Patent
Huang et al.

(10) Patent No.: US 11,329,952 B2
(45) Date of Patent: *May 10, 2022

(54) SYSTEM AND METHOD FOR DETECTING GENERATED DOMAIN

(71) Applicant: Beijing DiDi Infinity Technology and Development Co., Ltd., Beijing (CN)

(72) Inventors: Tao Huang, San Jose, CA (US);
Shuaiji Li, San Jose, CA (US);
Yinhong Chang, Milpitas, CA (US);
Fangfang Zhang, Cupertino, CA (US);
Zhiwei Qin, San Jose, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 23 days.

This patent is subject to a terminal disclaimer.

(21) Appl. No.: 16/936,171

(22) Filed: Jul. 22, 2020

(65) Prior Publication Data

US 2020/0351242 A1 Nov. 5, 2020

Related U.S. Application Data

(63) Continuation of application No. 16/220,360, filed on Dec. 14, 2018, now Pat. No. 10,764,246.

(Continued)

(51) Int. Cl.
*H04L 29/12* (2006.01)
*G06N 20/20* (2019.01)
(Continued)

(52) U.S. Cl.
CPC .......... *H04L 61/3025* (2013.01); *G06N 3/02* (2013.01); *G06N 7/005* (2013.01); *G06N 20/20* (2019.01); *H04L 61/1511* (2013.01)

(58) Field of Classification Search
CPC combination set(s) only.
See application file for complete search history.

(56) References Cited

U.S. PATENT DOCUMENTS

8,775,341 B1 7/2014 Commons
2008/0144927 A1* 6/2008 Hashimoto .......... G01N 29/045
382/156

(Continued)

FOREIGN PATENT DOCUMENTS

CN 105338001 A 2/2016

OTHER PUBLICATIONS

[N. d.]. DGA Domain Feed—Bambenek Consulting, https://osint.bambenekconsulting.com/feeds/dga-feed.txt. Accessed: Sep. 30, 2018.

(Continued)

*Primary Examiner* — El Hadji M Sall
(74) *Attorney, Agent, or Firm* — Sheppard Mullin Richter & Hampton LLP

(57) ABSTRACT

A computer-implemented method for domain analysis comprises: obtaining, by a computing device, a domain; and inputting, by the computing device, the obtained domain to a trained detection model to determine if the obtained domain was generated by one or more domain generation algorithms. The detection model comprises a neural network model, a n-gram-based machine learning model, and an ensemble layer. Inputting the obtained domain to the detection model comprises inputting the obtained domain to each of the neural network model and the n-gram-based machine learning model. The neural network model and the n-gram-based machine learning model both output to the ensemble layer. The ensemble layer outputs a probability that the obtained domain was generated by the domain generation algorithms.

20 Claims, 10 Drawing Sheets

Related U.S. Application Data

(60) Provisional application No. 62/718,736, filed on Aug. 14, 2018.

(51) Int. Cl.
*G06N 7/00* (2006.01)
*G06N 3/02* (2006.01)
*H04L 61/3015* (2022.01)
*H04L 61/4511* (2022.01)

(56) References Cited

U.S. PATENT DOCUMENTS

| | | | | |
|---|---|---|---|---|
| 2014/0304814 | A1* | 10/2014 | Ott | G06F 21/552 726/22 |
| 2016/0078361 | A1 | 3/2016 | Brueckner et al. | |
| 2016/0171974 | A1 | 6/2016 | Hannun et al. | |
| 2017/0293825 | A1* | 10/2017 | Shao | G06K 9/66 |
| 2018/0288086 | A1 | 10/2018 | Amiri et al. | |
| 2019/0114545 | A1 | 4/2019 | Lee et al. | |
| 2019/0155633 | A1* | 5/2019 | Faulhaber, Jr. | G06F 9/45558 |
| 2021/0224537 | A1* | 7/2021 | Inoshita | G06K 9/00664 |

OTHER PUBLICATIONS

Aashna Ahluwalia, Issa Traore, Karim Ganame, and Nainesh Agarwal. 2017. Detecting Broad Length Algorithmically Generated Domains. In Intelligent, Secure, and Dependable Systems in Distributed and Cloud Environments. Springer International Publishing, 19-34.
Manos Antonakakis, Roberto Perdisci, Yacin Nadji, Nikolaos Vasiloglou, Saeed Abu-Nimeh, Wenke Lee, and David Dagon. 2012. From Throw-Away Traffic to Bots: Detecting the Rise of DGA-Based Malware . . . In USENIX security symposium, vol. 12.
Alejandro Correa Bahnsen, Eduardo Contreras Bohorquez, Sergio Villegas, Javier Vargas, and Fabio A González. 2017. Classifying phishing URLs using recurrent neural networks. In Electronic Crime Research (eCrime), 2017 APWG Symposium on. IEEE, 1-8.
Rich Caruana, Nikos Karampatziakis, and Ainur Yessenalina. 2008. An empirical evaluation of supervised learning in high dimensions. In International Conference on Machine Learning, ICML, pp. 96-103.
Rich Caruana and Alexandru Niculescu-Mizil. 2005. An Empirical Comparison of Supervised Learning Algorithms Using Different Performance Metrics. In In Proc. 23 rd Intl. Conf. Machine learning (ICMLâĂŹ06. 161-168.
K. Chen, Y. Zhou, and F. Dai. 2015. A LSTM-based method for stock returns prediction: A case study of China stock market. In 2015 IEEE International Conference on Big Data (Big Data). 2823-2824. https://doi.org/10.1109/BigData.2015.7364089.
Tianqi Chen and Carlos Guestrin 2016. Xgboost: A scalable tree boosting system In Proceedings of the 22nd acm sigkdd international conference on knowledge discovery and data mining. ACM, 785-794.
Kyunghyun Cho, Bart Van Merriënboer, Caglar Gulcehre, Dzmitry Bahdanau, Fethi Bougares, Holger Schwenk, and Yoshua Bengio. 2014. Learning phrase representations using RNN encoder-decoder for statistical machine translation. arXiv preprint arXiv:1406.1078 (2014).
Sujata Garera, Niels Provos, Monica Chew, and Aviel D Rubin. 2007. A framework for detection and measurement of phishing attacks. In Proceedings of the 2007 ACM workshop on Recurring malcode. ACM, 1-8.
Felix A. Gers, Jürgen A. Schmidhuber, and Fred A. Cummins. 2000. Learning to Forget: Continual Prediction with LSTM. Neural Comput. 12, 10 (Oct. 2000), 2451-2471. https://doi.org/10.1162/089976600300015015.
Alex Graves, Abdel-rahman Mohamed, and Geoffrey Hinton. 2013. Speech Recognition with Deep Recurrent Neural Networks. ICASSP, IEEE International Conference on Acoustics, Speech and Signal Processing—Proceedings 38 (Mar. 2013), 6645-6649.
Sepp Hochreiter and Jürgen Schmidhuber. 1997. Long Short-Term Memory. Neural Comput. 9, 8 (Nov. 1997), 1735-1780. https://doi.org/101162/neco.1997.9.8.1735.
Hung Le, Quang Pham, Doyen Sahoo, and Steven CH Hoi. 2018. URLNet: Learning a URL Representation with Deep Learning for Malicious URL Detection. arXiv preprint arXiv:1802.03162 (2018).
Tim Finin Pranam Kolari and Anupam Joshi. 2006. SVMs for the Blogosphere: Blog Identification and Splog Detection. In AAAI Spring Symposium on Computational Approaches to Analysing Weblogs. Computer Science and Electrical Engineering, University of Maryland, Baltimore County. Also available as technical report TR-CS-05-13.
Brett Stone-Gross, Marco Cova, Lorenzo Cavallaro, Bob Gilbert, Martin Szyd-Iowski, Richard Kemmerer, Christopher Kruegel, and Giovanni Vigna. 2009. Your Botnet is My Botnet: Analysis of a Botnet Takeover. In Proceedings of the 16th ACM Conference on Computer and Communications Security (CCS '09). ACM, New York, NY, USA, 635-647. https://doi.org/10.1145/1653662.1653738.
Brett Stone-Gross, Marco Cova, Bob Gilbert, Richard Kemmerer, Christopher Kruegel, and Giovanni Vigna. 2011. Analysis of a botnet takeover. IEEE Security & Privacy 9, 1 (2011), 64-72.
Ilya Sutskever, Oriol Vinyals, and Quoc V. Le. 2014. Sequence to Sequence Learning with Neural Networks. In Proceedings of the 27th International Conference on Neural Information Processing Systems—vol. 2 (NIPS'14). MIT Press, Cambridge, MA, USA, 3104-3112. http://dl.acm.org/citation.cfm?id=2969033.2969173.
Jonathan Woodbridge, Hyrum S Anderson, Anjum Ahuja, and Daniel Grant. 2016. Predicting domain generation algorithms with long short-term memory networks. arXiv preprint arXiv:1611.00791 (2016).
Sandeep Yadav, Ashwath Kumar Krishna Reddy, AL Narasimha Reddy, and Supranamaya Ranjan. 2012. Detecting algorithmically generated domain-flux attacks with DNS traffic analysis. IEEE/Acm Transactions on Networking 20, 5 (2012), 1663-1677.
Iraj Sadegh Amiri, Oluwatobi Ayodeji Akanbi, and Elahe Fazeldehkordi. 2014. A machine-Learning approach to phishing detection and defense. Syngress.
Aaron Blum, Brad Wardman, Thamar Solorio, and Gary Warner. 2010. Lexical feature based phishing URL detection using online learning. In Proceedings of the 3rd ACM workshop on Artificial intelligence and security. ACM, 54-60.
Cicero dos Santos and Maira Gatti. 2014. Deep convolutional neural networks for sentiment analysis of short texts. In Proceedings of COLING 2014, the 25th International Conference on Computational Linguistics: Technical Papers. 69-78.
Kaiming He, Xiangyu Zhang, Shaoqing Ren, and Jian Sun. 2016. Deep residual learning for image recognition. In Proceedings of the IEEE conference on computer vision and pattern recognition. 770-778.
Alex Krizhevsky, Ilya Sutskever, and Geoffrey E Hinton. 2012. Imagenet classification with deep convolutional neural networks. In Advances in neural information processing systems. 1097-1105.
Anh Le, Athina Markopoulou, and Michalis Faloutsos. 2010. PhishDef: URL Names Say It All. CoRR abs/1009.2275 (2010). arXiv:1009.2275 http://arxiv.org/abs/1009.2275.
Justin Ma, Lawrence K. Saul, Stefan Savage, and Geoffrey M. Voelker. 2009. Identifying Suspicious URLs: An Application of Large-scale Online Learning. In Proceedings of the 26th Annual International Conference on Machine Learning (ICML '09). ACM, New York, NY, USA, 681-688. https://doi.org/10.1145/1553374.1553462.
Doyen Sahoo, Chenghao Liu, and Steven CH Hoi. 2017. Malicious URL detection using machine learning: A survey. arXiv preprint arXiv:1701.07179 (2017).
Stefano Schiavoni, Federico Maggi, Lorenzo Cavallaro, and Stefano Zanero. 2014. Phoenix: DGA-based botnet tracking and intelligence. In International Conference on Detection of Intrusions and Malware, and Vulnerability Assessment. Springer, 192-211.
Sandeep Yadav, Ashwath Kumar Krishna Reddy, AL Reddy, and Supranamaya Ranjan. 2010. Detecting algorithmically generated malicious domain names. In Proceedings of the 10th ACM SIGCOMM conference on Internet measurement. ACM, 48-61.

(56) References Cited

OTHER PUBLICATIONS

Wen Zhang, Yu-Xin Ding, Yan Tang, and Bin Zhao. 2011. Malicious web page detection based on online learning algorithm. In Machine Learning and Cybernetics (ICMLC), 2011 International Conference on, vol. 4. IEEE, 1914-1919.

Notice of Allowance dated Apr. 27, 2020, issued in related U.S. Appl. No. 16/220,360 (9 pages).

PCT International Search Report and the Written Opinion dated Oct. 4, 2019, issued in related International Application No. PCT/US2018/067774 (8 pages).

Bin, Y. et al., "Inline DGA Detection with Deep Networks", 2017 IEEE International Conference on Data Mining Workshops (ICDMW), Dec. 18, 2017.

Saxe, J. et al., eXpose: A Character-Level Convolutional Neural Network with Embeddings for Detecting Malicious URLs, File Paths and Registry Keys, Feb. 27, 2017 (18 pages).

Latah, M. "When deep learning meets security", Jul. 12, 2018 (9 pages).

\* cited by examiner

400

401: obtaining, by a computing device, a domain

401a: obtaining, by the computing device, the domain from a log of a local Domain Name Service (DNS) server

402: inputting, by the computing device, the obtained domain to a trained detection model to determine if the obtained domain was generated by one or more domain generation algorithms The detection model comprises a neural network model, a n-gram-based machine learning model, and an ensemble layer Inputting the obtained domain to the detection model comprises inputting the obtained domain to each of the neural network model and the n-gram-based machine learning model The neural network model and the n-gram-based machine learning model both output to the ensemble layer The ensemble layer outputs a probability that the obtained domain was generated by the domain generation algorithms

403a: forwarding, by the computing device, the determination to the local DNS server to block queries of the domain

401: obtaining, by a computing device, a domain

401b: obtaining, by the computing device, the domain from an agent software installed on a client device

402: inputting, by the computing device, the obtained domain to a trained detection model to determine if the obtained domain was generated by one or more domain generation algorithms The detection model comprises a neural network model, a n-gram-based machine learning model, and an ensemble layer Inputting the obtained domain to the detection model comprises inputting the obtained domain to each of the neural network model and the n-gram-based machine learning model The neural network model and the n-gram-based machine learning model both output to the ensemble layer The ensemble layer outputs a probability that the obtained domain was generated by the domain generation algorithms

403b: forwarding, by the computing device, the determination to the agent software to block communications with an Internet Protocol (IP) address of the domain

401: obtaining, by a computing device, a domain

401c: obtaining, by the computing device, the domain from a log of a network monitoring server

402: inputting, by the computing device, the obtained domain to a trained detection model to determine if the obtained domain was generated by one or more domain generation algorithms The detection model comprises a neural network model, a n-gram-based machine learning model, and an ensemble layer Inputting the obtained domain to the detection model comprises inputting the obtained domain to each of the neural network model and the n-gram-based machine learning model The neural network model and the n-gram-based machine learning model both output to the ensemble layer The ensemble layer outputs a probability that the obtained domain was generated by the domain generation algorithms

403c: forwarding, by the computing device, the determination to the network monitoring server to block queries of the domain

FIG. 4C

SYSTEM AND METHOD FOR DETECTING GENERATED DOMAIN

RELATED APPLICATION

This application is a continuation of U.S. patent application Ser. No. 16/220,360, filed on Dec. 14, 2018, which claims priority to U.S. Provisional Application No. 62/718,736, filed on Aug. 14, 2018, and entitled "System and Method for Detecting Generated Domain." The content of all of the above-identified applications are hereby incorporated by reference in the entirety.

TECHNICAL FIELD

This disclosure generally relates to domain analysis, and in particular, to systems and methods for detecting generated domain.

BACKGROUND

With the rapid advancement in technology and the proliferation of digital devices in today's world, the amount of data being generated, shared, and stored is more than ever before. This includes highly sensitive information such as credit card details, private and personal information such as social security numbers, addresses, and even government employee information. Whilst the digital revolution brings increased convenience in the form of, for example, online shopping, digital government, and banking services, cyber-criminals are also aware of the value of such data. Cyber threats are constantly evolving, with new and sophisticated techniques being developed and deployed to gain access to important or sensitive data.

Digital threats such as backdoors, trojans, info-stealers and bots can be especially damaging as they actively steal personal information or allow malicious attackers to remotely control computers for nefarious purposes, such as performing distributed denial-of-service attacks (DDos attacks) or sending spam mails. Since such malwares commonly need network communication with each other, and to avoid being take-down by the blacklisting method, many of them use domain generation algorithms (DGAs) to pseudo-randomly generate numerous domains for the communication. Thus, detecting these generated domains is important for discovering the digital threats and helping patch up vulnerabilities.

SUMMARY

Various embodiments of the present disclosure include systems, methods, and non-transitory computer readable media for domain analysis.

According to one aspect, a computer-implemented method for domain analysis comprises: obtaining, by a computing device, a domain; and inputting, by the computing device, the obtained domain to a trained detection model to determine if the obtained domain was generated by one or more domain generation algorithms. The detection model comprises a neural network model, a n-gram-based machine learning model, and an ensemble layer. Inputting the obtained domain to the detection model comprises inputting the obtained domain to each of the neural network model and the n-gram-based machine learning model. The neural network model and the n-gram-based machine learning model both output to the ensemble layer. The ensemble layer outputs a probability that the obtained domain was generated by the domain generation algorithms.

In some embodiments, obtaining, by the computing device, the domain comprises obtaining, by the computing device, the domain from a log of a local Domain Name Service (DNS) server. The method further comprises forwarding, by the computing device, the determination to the local DNS server to block queries of the domain.

In some embodiments, obtaining, by the computing device, the domain comprises obtaining, by the computing device, the domain from an agent software installed on a client device. The method further comprises forwarding, by the computing device, the determination to the agent software to block communications with an Internet Protocol (IP) address of the domain.

In some embodiments, obtaining, by the computing device, the domain comprises obtaining, by the computing device, the domain from a log of a network monitoring server. The method further comprises forwarding, by the computing device, the determination to the network monitoring server to block queries of the domain.

In some embodiments, the detection model comprises an extra feature layer, inputting the obtained domain to the detection model comprises inputting the obtained domain to the extra feature layer, the extra feature layer outputs to the ensemble layer, the domain is associated with a domain name and a top-level domain (TLD), and the extra feature layer comprises at least of the following features: a length of the domain name, a length of the TLD, whether the length of the domain name exceeds a domain name threshold, whether the length of the TLD exceeds a TLD threshold, a number of numerical characters in the domain name, whether the TLD contains any numerical character, a number of special characters contained in the domain name, or whether the TLD contains any special character.

In some embodiments, the ensemble layer comprises a top logistic regression model outputting the probability, the top logistic regression model comprises a plurality of ensemble coefficients respectively associated with the features, the output from the neural network model, and the output from the n-gram-based machine learning model, and the detection model is trained by: training the neural network model and the n-gram-based machine learning model separately, and inputting outputs of the trained neural network model and the trained n-gram-based machine learning model to the top logistic regression model to solve the ensemble coefficients.

In some embodiments, the neural network model comprises a probability network, the domain is associated with a domain name, a top-level domain (TLD), and a domain length as separate inputs to the probability network, the domain name is inputted to a one-hot encoding layer and a recurrent neural network layer, before being inputted to a dense and batch normalization layer, the TLD is inputted to an embedding and batch normalization layer, before being inputted to the dense and batch normalization layer, the domain length is inputted to the dense and batch normalization layer, and the dense and batch normalization layer outputs a predicted probability that the obtained domain was generated by the domain generation algorithms. In one example, the recurrent neural network layer comprises long-short term memory (LSTM) units.

In some embodiments, the neural network model comprises a representation network, the domain is associated with a domain name and a top-level domain (TLD) as separate inputs to the representation network, the domain name is inputted to an embedding and batch normalization layer and a recurrent neural network layer, before being inputted to a dense and batch normalization layer, the TLD is inputted to an embedding and batch normalization layer, before being inputted to the dense and batch normalization layer, and the dense and batch normalization layer outputs a dense representation of the domain. In one example, the recurrent neural network layer comprises gated recurrent units (GRU).

In some embodiments, the n-gram-based machine learning model comprises a gradient boosting based classifier based on bigram features.

In some embodiments, the obtained domain comprises one or more Chinese Pinyin elements.

According to another aspect, a system for domain analysis, comprises a processor and a non-transitory computer-readable storage medium storing instructions that, when executed by the processor, cause the processor to perform a method for domain analysis. The method comprises: obtaining a domain, and inputting the obtained domain to a trained detection model to determine if the obtained domain was generated by one or more domain generation algorithms. The detection model comprises a neural network model, a n-gram-based machine learning model, and an ensemble layer. Inputting the obtained domain to the detection model comprises inputting the obtained domain to each of the neural network model and the n-gram-based machine learning model. The neural network model and the n-gram-based machine learning model both output to the ensemble layer. The ensemble layer outputs a probability that the obtained domain was generated by the domain generation algorithms.

According to another aspect, a non-transitory computer-readable storage medium stores instructions that, when executed by a processor, cause the processor to perform a method for domain analysis. The method comprises: obtaining a domain, and inputting the obtained domain to a trained detection model to determine if the obtained domain was generated by one or more domain generation algorithms. The detection model comprises a neural network model, a n-gram-based machine learning model, and an ensemble layer. Inputting the obtained domain to the detection model comprises inputting the obtained domain to each of the neural network model and the n-gram-based machine learning model. The neural network model and the n-gram-based machine learning model both output to the ensemble layer. The ensemble layer outputs a probability that the obtained domain was generated by the domain generation algorithms.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4A illustrates a flowchart of an exemplary method for of domain analysis, in accordance with various embodiments.

FIG. 4B illustrates a flowchart of another exemplary method for of domain analysis, in accordance with various embodiments.

FIG. 4C illustrates a flowchart of another exemplary method for of domain analysis, in accordance with various embodiments.

DETAILED DESCRIPTION

Figure 1:
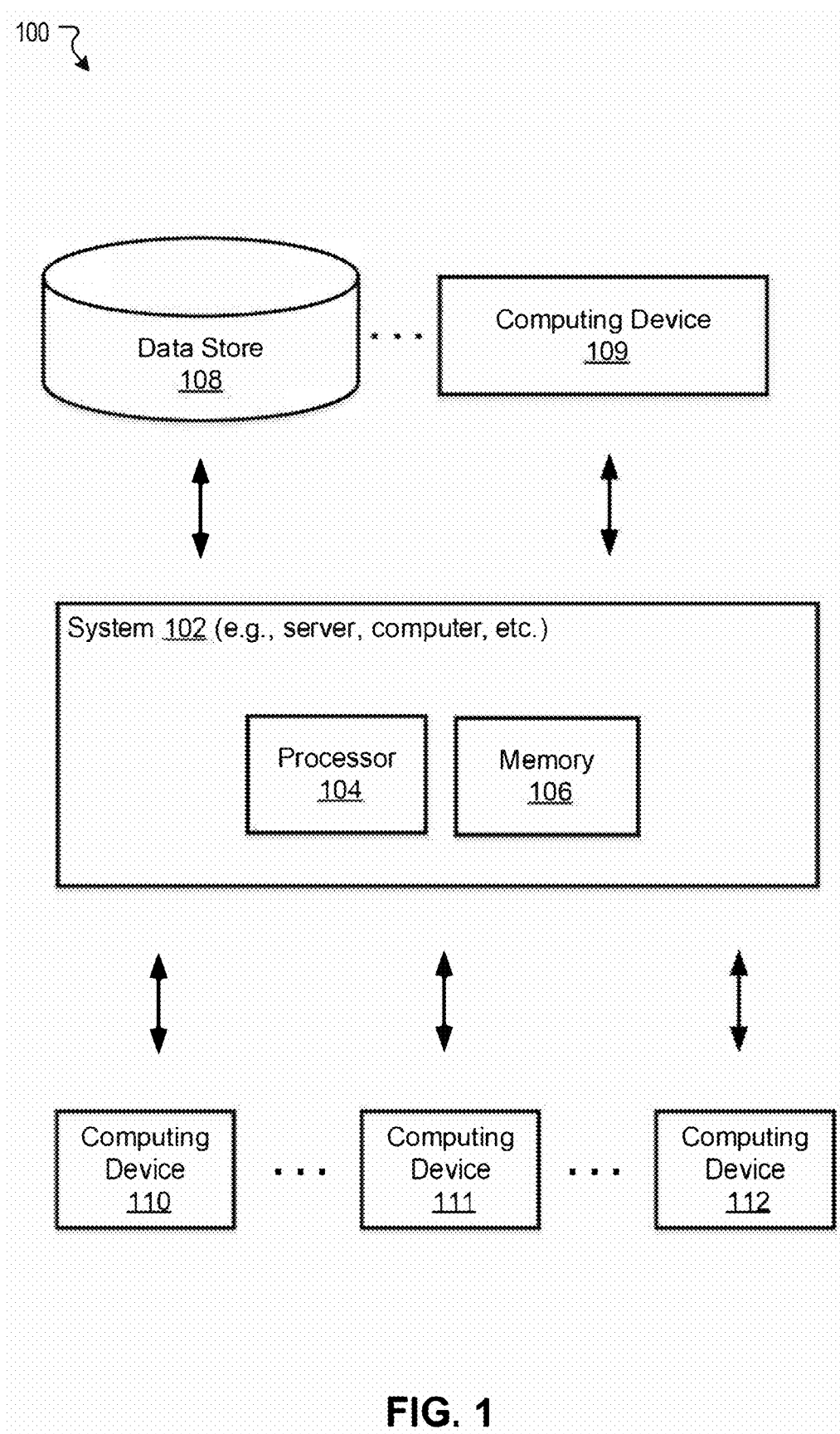
FIG. 1 illustrates an exemplary environment for domain analysis, in accordance with various embodiments.

Digital threats such as backdoors, trojans, info-stealers, and bots can be especially damaging nowadays as they actively steal information or allow remote control for nefarious purposes. Since such malwares commonly need network communication with each other, and to avoid being takedown by the blacklisting method, many of them use domain generation algorithms (DGAs) to pseudo-randomly generate numerous domains for the communication. In this disclosure, a generated domain may refer to a domain that is generated by one or more DGAs. DGA may generally represent malwares or other software that generate domains for malicious purposes. DGAs are constantly evolving and these generated domains are mixed with benign queries in network communication traffic each day, making the detection difficult. The domain may be, for example, a Uniform Resource Locator (URL) or a part of a URL. As discussed later, the analyzed parts of the domain may comprise one or more of: a sub-domain, a domain name, a top-level domain (TLD), etc. Although the disclosed embodiments are mostly directed to detecting domains generated by DGAs, these embodiments can apply to analyzing domains in general.

In some embodiments, a typical malware communicates with an attacker controlled Command and Control (C&C) server via C&C channels for receiving updates, commands, or other information. For example, backdoors and bots receive commands through the C&C channel, and info-stealers send stolen banking and login information through its C&C channel. In order for the malware to communicate with its C&C server, it has to know the server's IP address. One straightforward way to accomplish this is hard-coding a list of IP addresses or domain names in the malware (or in the malware's configuration file). However, this hard-coding method renders the malware susceptible to disablement by simple IP or domain blacklisting. A list of known malicious IP or domains can be used as indicators of compromises and be blocked by security systems. An IP or domain take-down can also effectively destroy the whole malware network. Thus, for the hackers to avoid detection of the malware IPs and domains and prevent such take-downs, some malware families adopted the use of DGAs to generate a large number of pseudo-random domains from a specified seed. The malware and C&C servers share the same seed and pseudo-random algorithm. For example, a DGA may use a date as its seed, as in the Torpig malware, or even use a character of a tweet as its seed, as in an upgraded version of Torpig. Malware employing DGAs can generate a set of new domains from each seed and attempt to connect to these domains. The generated domains can be used as rendezvous points with the C&C servers. The large number of potential rendezvous points makes it difficult for law enforcement to effectively shut down botnets, since infected computers will attempt to contact some of these domain names every day to receive updates or commands. As the malware will continually try resolving and connecting to each domain, only a small subset of these domains need to be pre-registered by an attacker for the whole scheme to work. Because any seed value and algorithm can be used in the DGA scheme, it is difficult to predict the domains that each malware will use. Therefore, the DGA method effectively renders current countermeasures such as IP/domain blacklisting useless.

The disclosed systems and methods can at least mitigate the above-described technical problems of current practice. Various embodiments of the present disclosure include systems, methods, and non-transitory computer readable media for detecting generated domain. In various embodiments, a detection model that combines neural network, n-gram-based machine learning model, and extra domain features is disclosed. The neural network, n-gram-based machine learning model, and extra domain features complement each other, showing significant improvement in terms of detection accuracy. For example, the detection model can detect benign domains that appear like generated domains, such as domains comprising letters and number, or comprising Chinese Pinyin. Further details of the detection model are described below with reference to FIG. 1 to FIG. 5.

FIG. 1 illustrates an exemplary environment 100 for domain analysis, in accordance with various embodiments. As shown in FIG. 1, the exemplary environment 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The system 102 may be implemented on or as one or more computing devices such as mobile phone, tablet, server, computer, wearable device, etc. The system 102 above may be installed with a software (e.g., platform program) and/or hardware (e.g., wires, wireless connections) to access other devices of the environment 100.

The environment 100 may include one or more data stores (e.g., a data store 108) and one or more computing devices (e.g., a computing device 109) that are accessible to the system 102. The data store 108 and the computing device may be optional and may assist the system 102 in performing various operations described herein. For example, the system 102 may obtain training data, such as benign and generated domains from the data store 108 and/or computing device 109. The obtained training data may be stored in the memory 106 or otherwise available to the processor 104 (e.g., over a network). The processor 104 may train various models and execute various algorithms described herein.

The environment 100 may further include one or more computing devices (e.g., computing devices 110, 111, and 112) coupled to the system 102. The computing devices 110, 111, and 112 may each comprise server, computer, cell-phone, tablet, wearable device, etc. The computing devices 110, 111, and 112 may transmit or receive information, data, or instruction to or from the system 102. Exemplary embodiments of the computing devices 110, 111, and 112 are described below with reference to FIG. 2.

In some embodiments, the system 102 and the one or more of the computing devices (e.g., the computing device 109) may be integrated in a single device or system. Alternatively, the system 102 and the one or more computing devices may operate as separate devices. The data store(s) may be anywhere accessible to the system 102, for example, in the memory 106, in the computing device 109, in another device (e.g., network storage device) coupled to the system 102, or another storage location (e.g., cloud-based storage system, network file system, etc.), etc. Although the system 102 and the computing device 109 are shown as single components in this figure, it is appreciated that the system 102 and the computing device 109 can be implemented as single devices or multiple devices coupled together. The system 102 may be implemented as a single system or multiple systems coupled to each other. The system 102, computing device 109, data store 108, computing devices 110, 111, and 112 may be able to communicate with one another through one or more wired or wireless networks (e.g., the Internet) through which data can be communicated. Various aspects of the environment 100 are described below in reference to FIG. 2 to FIG. 5.

Figure 2:
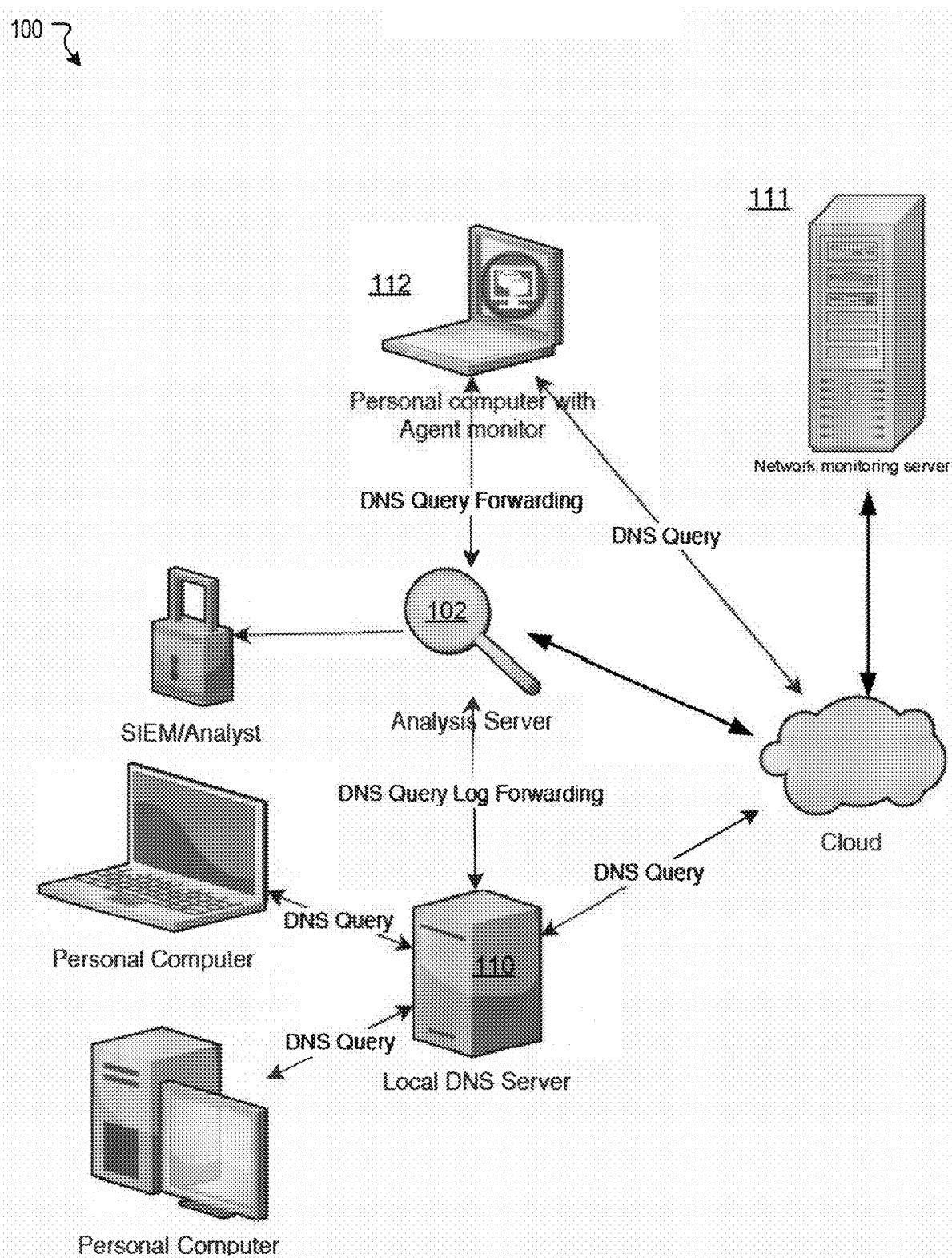
FIG. 2 illustrates an exemplary system interaction for domain analysis, in accordance with various embodiments.

FIG. 2 illustrates an exemplary system interaction for domain analysis, in accordance with various embodiments. The operations shown in FIG. 2 and presented below are intended to be illustrative. As shown in FIG. 2, the domains being queried in a network can be obtained by the system 102 (e.g., analysis server) in various ways. For example, the system 102 may obtain one or more domains via the computing device 110 (e.g., local DNS server), the computing device 111 (e.g., network monitoring server), the computing device 112 (e.g., client device), etc. The system 102 may acquire the domains from logs (e.g., domain query logs) of the local DNS server and/or the monitoring server. The system 102 may acquire the domains from an agent software installed on the client device, the agent software recording domains queried by the client device.

Domain Name Service (DNS) is a protocol through which computers use to convert textual host identifiers (www.example.com) into an IP address (93.184.216.34), which is used to locate a computer (server) on the Internet. Such translation occurs through the use of a DNS query. In the example given, a computer performs a DNS query for the domain www.example.com and receives a DNS response of the IP address 93.184.216.34. DNS queries are sent to the DNS servers, which can respond with an IP address if it knows the mapping between the requested domain and the IP address. If not, the request will be forwarded to another DNS server which may know the answer of the query. This process is recursively performed until a response is received.

In some embodiments, once a domain query is captured (e.g., by the DNS server, monitor server, or agent software), a service (e.g., system 102) may obtain the domain for domain analysis. Once the analysis is performed and a verdict is given (e.g., the domain is benign or malicious/generated), the system 102 can transmit the determination to the local DNS server 110 to block future queries of a malicious domain, to the network monitoring server 111 to block future queries of a malicious domain, or to the agent software on the client device 112 to block communications to the resolved IP address of a malicious domain. The determination can also be forwarded to a security information and event management system (SIEM), allowing security analysts to perform remediation or any further analysis.

Due to the high volume of DNS traffic, a real-time DGA classifier becomes important for blocking malware's C&C channels as early as possible, because blacklisting becomes inefficient, and reverse engineering of the DGA may only work for a limited time as attackers update the seeds and algorithms. That is, an efficient real-time DGA classifier on domains in Domain Name System (DNS) log is desirable to detect the generated domains that are potentially malicious. To build such classifiers, many features can be extracted, such as lexical features that describe the URL, contextual features, or host-based features. Existing technologies either (1) rely on group contextual/statistical features or extra host-based information and thus need long time window, (2) depend on lexical features extracted from domain strings to build real-time classifiers, or (3) directly build an end-to-end deep neural network to make prediction from domain strings. The performance of existing technologies, for example, in terms of precision and recall rate, may be inadequate. In this disclosure, systems and methods for domain analysis are provided. Several new real-time detection models and frameworks which utilize meta-data generated from domains are described. The disclosed systems and methods combine the advantages of deep neural network models and a lexical features based model using the ensemble technique, resulting in a better performance than all state-of-art methods. For example, results have shown both precision and recall at 99.8% on a widely used public dataset.

Artificial neural networks (ANNs) are a family of very powerful machine learning models that can achieve high performance on many difficult problems and gain increasing popularity in recent years. ANNs can be used to learn the patterns in the malicious URL strings and lexical features extracted from these strings, like string length, special character numbers, etc. RNNs (recurrent neural networks) are a class of artificial networks with loops (so called recurrences) that recursively combine the input vectors with the network state vectors to produce a new state vector, thus allowing temporal information to persist in the learning process, and therefore successfully learn some patterns in the data sequence. In particular, long-short term memory (LSTM) is a special kind of RNN frequently used in data with long term temporal dependencies or dynamics. It solves the vanishing gradient problem that a vanilla RNN may have (this problem makes "memorizing" long-range dependencies difficult) by employing cells that preserve information and use 3 "gates" (input, output, and forget) to control the information flow. Gated recurrent unit (GRU) is another popular RNN that solves, similar to LSTM, vanishing gradient problem. The difference is that GRU uses a reset gate and an update gate to control the states and information persistence. Besides, a trained RNN-based model (like LSTM or GRU) is fast in inferencing and prediction, and hence it is suitable for domains like real-time malicious URL or DGA classification.

Some existing models solely rely on an LSTM of the string itself, and neglect a wide range of lexical features that can be extracted and assist the classification. Potentials of failures caused by such drawback lie in two folds. First, sole URL string based model may "overly" deploy the dataset used as negatives (e.g., alexa top 1 million domains) and positives in training set, and perform not so well in reality 2, as discussed later. Second, some lexical features, like n-gram, special character, top level domains, and domain length may convey patterns that can really help the classification. RNN model may learn these helpful patterns finally in an implicit way with plenty of data, but not as efficient as combining these features directly in the model. Combining string based RNN model and extracted lexical features can help balance the model focus and at least mitigate the above described flaws. Accordingly, various embodiments of the present disclosure include systems, methods, and non-transitory computer readable media for domain analysis (e.g., detecting URLs generated by DGA). New frameworks that utilize both RNNs, which is powerful in learning string sequences, and lexical features, which can essentially assist prediction in "bad" cases and make performance improvement are disclosed. Further, a detection model that combines the neural network, n-gram framework, and extra lexical features is also described. The disclosed systems and methods can at least mitigate the above-described technical problems of current practice.

In some embodiments, the obtained domain may be in a string format, comprising letters, numbers, and/or special characters. The domain may be associated with a domain name, a top-level domain (TLD), and/or a domain length.

In some embodiments, two alternative RNN-based models (a probability network model and a representation network model) and an n-gram-based Xgboost model are disclosed. Two of more of the above models are integrated into a detection model that combines the best of all for detecting generated domains.

Figure 3A:
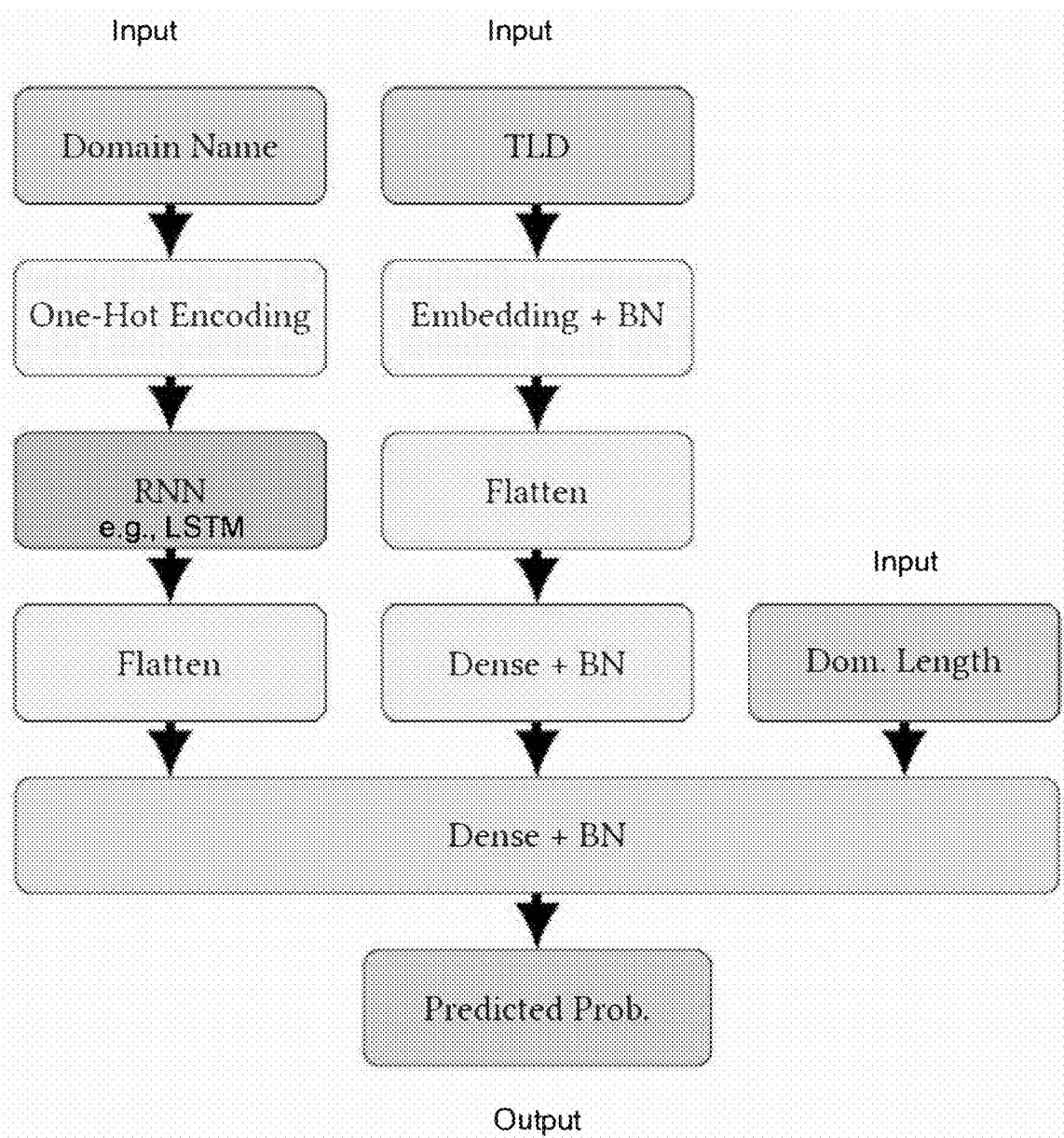
FIG. 3A illustrates an exemplary probability network for domain analysis, in accordance with various embodiments.

For the probability network, the deep learning model may capture the pattern in the URLs in order to make prediction of the probability that a given URL is DGA. A graphical illustration of the structure of the probability network model is shown in FIG. 3A, in accordance with various embodiments. As shown, domain name feature is combined with extra lexical features like top-level-domain (TLD) and string length to predict the probability that a domain is generated. A TLD is the highest level domain in the hierarchical DNS of the Internet. For example, in URL "photos.google.com," "photos" is the sub-domain, "google" is the domain name, and "com" is the TLD. For another example, in URL "www.library.shinjuku.tokyo.jp," "library" is the domain name, and "shinjuku.tokyo.jp" is the TLD.

As shown, the domain name may pass through a one-hot encoding, a RNN, and a flatten layer, and be inputted to a second dense+batch normalization (BN) layer. The TLD may pass through an embedding+BN layer, a flatten layer, and a first dense+BN layer, and be inputted to the second dense+BN layer. Domain length may also be inputted to the second dense+BN layer. With the three inputs, the second dense+BN layer can output the predicted probability.

In some embodiments, the dense layer involves a linear operation on the layer's input vector, and the batch normalization involves standardizing the activations going into each layer, enforcing their means and variances to be invariant to changes in the parameters of the underlying layers. The dense+BN layer may output a dense representation of the input.

In some embodiments, string type inputs of the domain name and the TLD may be tokenized, and truncated or padded to a uniform length. Subsequently, one-hot encoding can be applied to the domain name, and embedding can be applied to the TLD to each transform the tokenized string input to a reasonable numerical representation that can be fed into learning models. One-hot encoding transforms all the information from the original input to a sequence of binary representations. On the other hand, embedding condenses the information from the original sequence and can be optimized together with the subsequent models, but may also lose some useful information from the original sequence. Here, the full information from the domain name is fed by one-hot encoding, while the TLD input is processed by an embedding layer to the TLD input, because a TLD can take its value in a predefined list and thus is relatively less complex compared to domain names.

In some embodiments, the output of the one-hot coding to is fed to an RNN (e.g., LSTM) to learn the DGA patterns in the domain name sequence and may be subsequently flattened for follow-up processes. For example, the flatten layer may flatten an n by m matrix to a 1 by (n+m) matrix. The outputs, concatenated with the domain length and the output from TLD processing, may be fed into one or multiple fully connected layers (e.g., dense+batch normalization (BN)) before the probability prediction is generated from a final sigmoid activation.

Figure 3B:
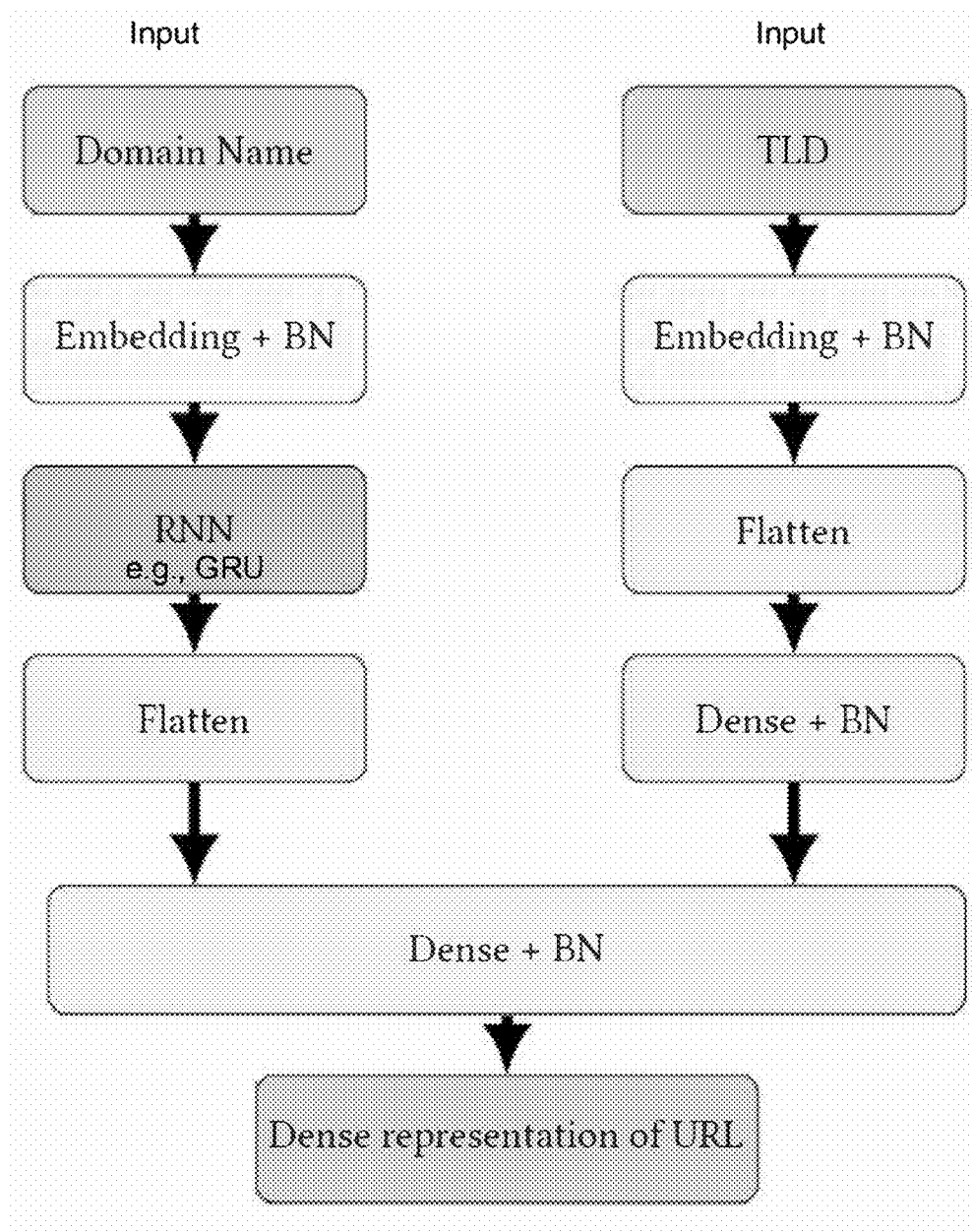
FIG. 3B illustrates an exemplary representation network for domain analysis, in accordance with various embodiments.

FIG. 3B is a graphical illustration of the structure of the representation network model, in accordance with various embodiments. The representation network model learns a dense representation of the information carried in the DGA, i.e., an encoder. As shown, the domain name may pass through an embedding+BN layer, a RNN, and a flatten layer, and be inputted to a fourth dense+BN layer. The TLD may pass through an embedding+BN layer, a flatten layer, and a third dense+BN layer, and be inputted to the fourth dense+BN layer. With the two inputs, the fourth dense+BN layer can output the dense representation of the domain URL (e.g., a 32-dimensional vector containing information of the domain name and TLD).

DNN can be used as a very efficient extractor of implicit features. In some embodiments, taking an embedded domain name as the input, a standard RNN may produce a matrix representation where each character within the input sequence is encoded to a vector. Similar to the probability network, the matrix is then flattened and concatenated with a dense representation of the TLD, and then fed together into a fully connected layer for translation. Instead of mapping this input to the final probability prediction directly, a vector representation of both domain name and TLD information is outputted via one or multiple fully connected layers. This low-dimensional representation is saved as a group of new features for a detection model described later.

Comparing the representation work model in FIG. 3B with the probability network model in FIG. 3A, the domain length is no longer used as input with the consideration that the extracted features should be a holistic representation of the input domain. To further expedite the training procedure, the one-hot encoder is replaced with an embedding layer to encode domain names that can be trained with the entire DNN through back-propagation. Besides, GRU is used to acquire the hidden values of embedded sequences. Compared with LSTM, GRU has no memory unit and is therefore faster to train. These changes make the representation network model light-weight and easier to train, with almost no performance drop compared to using probability network.

In addition to the deep neural network models, a n-gram-based model (e.g., Xgboost model) for learning the pattern of DGAs is disclosed. The n-gram is a contiguous sequence of n items from a given sample of text. The items can be letters, numbers, or special characters. An n-gram model is a type of probabilistic language model for predicting the next item in such a sequence in the form of a (n−1) order Markov model. Using Latin numerical prefixes, an n-gram of size 1 is referred to as a "unigram;" size 2 is a "bigram." Here, n can be 1, 2, 3, etc. For example, a bigram (n=2) occurrence count table may be constructed for each possible character bigram from training data. The intuition is that generative algorithms such as DGAs are unlikely to generate domain names that preserve a bigram distribution that is exactly the same as legitimate domain names. For a benign domain, it is common to see some "regular" combinations, such as "go" within "Google," or "be" within "YouTube," either of which contains legitimate lexical items or follows general pronunciation habit in English or some other language (e.g., Chinese Pinyin). A malicious DGA, in contrast, tends to disrupt the order of characters to circumvent the patterns captured in blacklists. Hence, a DGA domain with counts on less frequent character bigrams is likely to be detected through an n-gram-based model.

In some embodiments, the n-gram-based machine learning model comprises a gradient boosting based classifier based on bigram features. Once the character bigram features are obtained, a gradient boosting based classifier (e.g., Xgboost) can be trained to make a prediction. Compared to conventional gradient boosting decision-tree (GBDT) and Adaboost, Xgboost can be trained in distributed fashion using multi-cores, which drastically speeds up the training process. Although unigram and trigram features can be used to train classifiers like a random forest (RF) DGA classifier, bigram features outperform unigram or trigram features in all evaluation metrics described herein. Further, gradient boosting based models may perform better than RF regardless the choice of n in character n-grams. Although both RF and Xgboost belong to ensemble learning methods, they differ in multiple aspects. For RF, the order of trees is not important since each tree is built independently using bootstrap samples of training data. Xgboost, on the other hand, adds new trees to already built ones by continuously minimizing the pseudo-residual over decision-tree space. As long as the hyperparameters are carefully tuned, gradient boosting based models are more robust than RF over a regular feature space with a dimension less than 4,000 because of the above difference in training objective. For the disclosed systems and methods, the number of bigram features is about a thousand, which is less than 4,000.

As discussed, RNN-based models are good at learning temporal information in sequence data. The disclosed RNN-based models may be featureless, with syntactic and semantic representations only taken into account implicitly through the training process. Global patterns in domain names and long term correlations among characters can be captured for malicious and benign domains. However, the global "randomness" of the generated domains is hardly captured by the RNN if a training set has inadequate instances of some generation algorithms. Meanwhile, n-gram-based model is better in detecting malicious domains that share character n-gram (local patterns, as opposed to full string patterns) distributions with known DGAs in the training set. It does not retain any semantic meaning of a sequence. Therefore, it is possible that a benign domain is classified as DGA by the n-gram model because it shares some bigram tokens with some malicious domains in the training set even though the bigram's position in the string, or leading/following bigrams are different. This yields a high false positive rate (FPR), which costs more further investigations and, of course, higher labor costs.

In some embodiments, to mitigate the influence of global and local information, and maintain the efficacy of the model with lower false positive rate and false negative rate, a detection model that encompasses the virtue of both RNN-based and n-gram-based models as well as some extra URL-based features is disclosed. The extra features from a domain may include one or more of the following examples:

Length of name s (s∈{domain name, TLD}) (e.g., length of domain name as represented by domain_len, length of TLD as represented by tld_len);

Whether the length of name s is larger than a threshold $c_s$ (s∈{domain name, TLD}) (e.g., whether the length of domain name is greater than a threshold of 45 as represented by is_dom_ge_45, whether the length of TLD is greater than a threshold of 7 as represented by is_tld_ge_7);

Number of numerical characters contained in domain name, for example, as represented by #_num_char;

Whether TLD contains any numerical character, for example, as represented by is_num_in_tld;

Number of special characters contained in domain name, for example, as represented by #_spec_char; and Whether TLD contains any special character, for example, as represented by is_spec_in_tld.

Figure 3C:
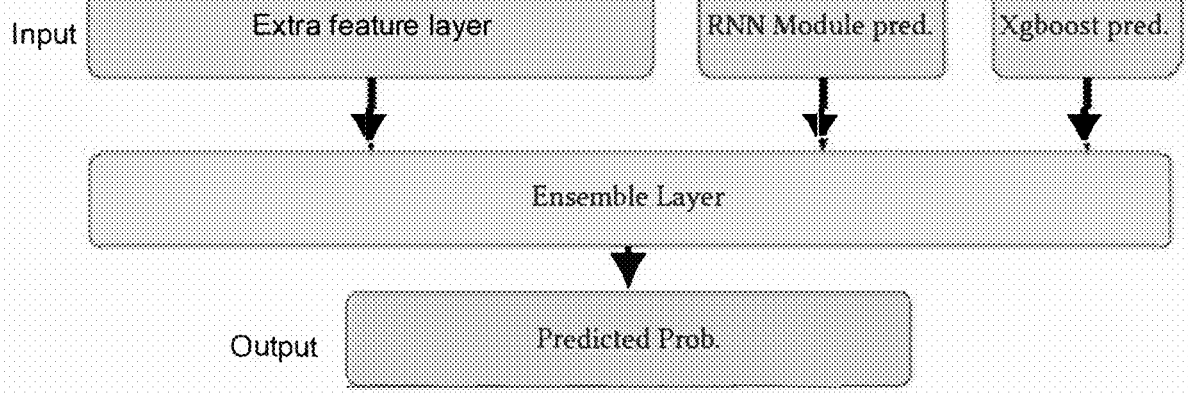
FIG. 3C illustrates an exemplary detection model for domain analysis, in accordance with various embodiments.

A graphical description of the detection model is shown in FIG. 3C. As shown, in some embodiments, RNN module prediction is concatenated with the probability predictions from Xgboost model, which together with the extra features (in an extra feature layer) obtained from domain strings, are fed a top logistic regression model (ensemble layer) for the final DGA probability prediction. The RNN model prediction may include the DGA probability predictions (probability network model) and/or the hidden representations of domains from RNN-based model (representation network model). A detection model comprising the former may be referred to as the ensemble-probability model, and a detection model comprising the latter may be referred to as the ensemble-representation model. The ensemble-probability model has 10 features (1 from the probability network, 1 from the n-gram model, and 8 from the extra features), while the ensemble-representation model has 42 features (32 from the representation network, 1 from the n-gram model, and 8 from the extra features). The final DGA probability prediction is:

$$p_i = \frac{1}{1 + \exp[-(w^T x_i + b)]}$$
$$= \frac{1}{1 + \exp[-(w_1 x_{1i} + w_2 x_{2i} + \ldots + w_d x_{di} + b)]}$$

where w is the linear weights, $x_i = (x_{1i}, x_{2i}, \ldots, x_{di})^T$ is the concatenated vector containing extra features and output from the upstream components, and b is the model bias.

In some embodiments, at the training stage, both RNN-based model and gradient boosting based model are trained separately. On the second stage, their predictions/hidden representations on training data are used in the top logistic regression model training to solve for the ensemble coefficients. By default the coefficients are regularized with ℓ norm, and the coefficient of the regularization term is found by grid search.

The above-described models may be tested for performance. In some embodiments with respect to the probability network model, an LSTM network comprising one layer of 256 units is implemented as RNN in the probability network model. LSTM output sequences are flattened before being sent to the fully connected dense layers. TLDs are first embedded to 5-dimensional vectors and then fed to a 32 units dense layer with rectifier activation. LSTM model output, TLD output and domain length were concatenated and then fed to a 32 units dense layer with rectifier activation. The output layer is a 1 unit dense layer with sigmoid activation. Batch normalization layers are added to some layers as shown in FIG. 3A.

In some embodiments with respect to the representation network model, domain names are first embedded to 63-dimensional vectors and fed into an RNN that comprising one layer of 256 GRU hidden units. TLDs are embedded to 7-dimensional vectors and fed to a 32 units fully connected layer. GRU output matrices are then flattened and concatenated with the dense representations of TLDs and fed together into a 64 units dense layer. Two subsequent dense layers, with 32 dense units and 1 dense unit respectively, are employed to transform joint dense representations into probability measures. Rectifier activation is used on all intermediate dense layers, and the last layer is activated through a sigmoid function.

For both probability and representation networks, the likelihood of a training instance being true malicious DGA is maximized by optimizing binary cross-entropy loss. Once the representation network is trained, output vectors of the second to last layer (a fully connected 32 units layer) are saved for training a top-level meta model shown in FIG. 3C.

In some embodiments with respect to the n-gram-based models, the performance of random forest and Xgboost classifiers are tested on unigram, bigram, and trigram features of domain names, respectively. Character n-gram features are extracted on training set, with random holdout test set to measure the generalizability to detect DGA from benign URLs. To reduce potential overfitting, the hyperparameters including number of tress and maximum depth of each tree are grid-searched for each classifier. Logistic loss is chosen as the objective function of Xgboost, and learning rate is fixed to 0.1. Information gain entropy is used as the node splitting criterion for random forest.

In some embodiments with respect to the ensemble layer, once the RNN-based model and n-gram-based model are thoroughly trained, a top-level logistic regression model may be built on top of either the predicted probabilities or the hidden representations together with some URL-based features, as shown in FIG. 3C. The top-level feature space contains either 10 features or 41 features, depending on whether the probability network or the representation network is employed. The Threshold $c_s = \{45, 7\}$, and special characters include common symbols such as hyphen and period. The layer weights are regularized with ℓ norm, and the penalty parameter is grid-searched through cross-validation. Hereinafter, the generated features may be referred to as domain_len, tld_len, is_dom_ge_45, is_tld_ge_7 (if the length of TLD is greater than 7), #_num_char, is_num_in_tld, #_spec_char, is_spec_in_tld.

In some embodiments, Table 1 summarizes the test performance of the described models. The disclosed models outperform the existing methods. For the n-gram-based model, for all three cases (n=1, 2, 3), n=2 is the best configuration. Overall, the n-gram, tree based models underperform the disclosed probability network. Both ensemble-probability model (the probability model shown in FIG. 3C with the neural network model being the probability network) and ensemble-representation model (the probability model shown in FIG. 3C with the neural network model being the representation network) outperform the rest models, and show significant improvements over existing methods to achieve the best performance on DGA classification. Ensemble-probability model achieves 99.77% precision and recall.

TABLE 1

Model evaluation

| | | Evaluation metrics | | | | |
|---|---|---|---|---|---|---|
| | Model | Precision | Recall | F1-score | Accuracy | AUC |
| RNN-based | Probability network | 0.9959 | 0.9903 | 0.9931 | 0.9933 | 0.9996 |
| N-gram-based | RF (unigram) | 0.9637 | 0.9624 | 0.9628 | 0.9629 | 0.9919 |
| | RF (bigram) | 0.9737 | 0.9772 | 0.9727 | 0.9728 | 0.9965 |
| | RF (trigram) | 0.9482 | 0.9424 | 0.9434 | 0.438 | 0.9928 |
| | Xgboost (unigram) | 0.9669 | 0.9661 | 0.9664 | 0.9665 | 0.9934 |
| | Xgboost (bigram) | 0.9851 | 0.9847 | 0.9849 | 0.9849 | 0.9985 |
| | Xgboost (trigram) | 0.9618 | 0.9611 | 0.9614 | 0.9614 | 0.9914 |
| Detection model | Ensemble-probability | 0.9977 | 0.9977 | 0.9977 | 0.9977 | 0.9999 |
| | Ensemble-representation | 0.9967 | 0.9967 | 0.9967 | 0.9967 | 0.9998 |

As shown in Table 2, the weights $w_1$ (corresponds to the output probability from the probability network) and $w_2$ (corresponds to the output probability of the n-gram model) are 6.9057 and 9.3469 respectively. The n-gram Xgboost model exhibits a larger impact than the probability network on final predictions of the ensemble layer, even though the probability network outperforms the n-gram model when tested separately.

TABLE 2

Weights of the ensemble layer in the ensemble-probability model

| | Probability network | N-gram | domain_len | tld len |
|---|---|---|---|---|
| Weight | 6.9057 | 9.3469 | 0.0008 | 0.1307 |
| | is_dom_ge_45 | is_tld_ge_7 | #_num_char | is_num_in_tld |
| Weight | −0.0136 | −0.0832 | −0.0994 | −0.0325 |
| | #_spec_char | is_spec_in_tld | b | |
| Weight | −1.5355 | −1.5196 | −7.3310 | |

In the test set, selective URLs are examined, based on which the probability network and the n-gram-based Xgboost model of the ensemble-probability model predict differently. Contribution of each component to the final prediction is shown in Table 3. The first two columns show the probability network and n-gram model output probabilities respectively. The third and fourth columns of Table 3 show the component values of these two models (i.e., $w_1 x_{1i}$ and $w_2 x_{2i}$ respectively), while the fifth column is the sum $w_1 x_{1i} + w_2 x_{2i}$. As shown, a larger $w_1 x_{1i} + w_2 x_{2i}$ component value is proportional to a higher final predicted probability produced by the detection model, indicating that the two probability features dominate the top layer's feature space in terms of feature importance.

TABLE 3

Selected ensemble-probability model's prediction components of sample URLs

| URL | RNN prob. | N-gram prob. | RNN comp. value | N-gram comp. value | RNN + N-gram comp. value | Ensemble prob. | True label | Pred. |
|---|---|---|---|---|---|---|---|---|
| xizanglvyou.org | 0.9274 | 0.0134 | 6.4042 | 0.1248 | 6.5290 | 0.4010 | 0 | True |
| laocaifengxitong.cc | 0.8176 | 0.0410 | 5.6458 | 0.3836 | 6.0294 | 0.2636 | 0 | True |

TABLE 3-continued

Selected ensemble-probability model's
prediction components of sample URLs

| URL | RNN prob. | N-gram prob. | RNN comp. value | N-gram comp. value | RNN + N-gram comp. value | Ensemble prob. | True label | Pred. |
|---|---|---|---|---|---|---|---|---|
| v4dwkcv.com | 0.0962 | 0.9388 | 0.6643 | 8.7747 | 9.4390 | 0.9173 | 0 | False |
| qlzn6i1l.com | 0.2917 | 0.9750 | 2.0145 | 9.1128 | 11.1274 | 0.9819 | 0 | False |
| bwcfholo.com | 0.0521 | 0.8770 | 0.3595 | 8.1975 | 8.5570 | 0.8354 | 1 | True |
| iggoradd.com | 0.3647 | 0.8759 | 2.5183 | 8.1865 | 10.7048 | 0.9775 | 1 | True |
| ysmyhuh.net | 0.6434 | 0.1778 | 4.4435 | 1.6621 | 6.1056 | 0.3041 | 1 | False |
| gentleshould.net | 0.9644 | 0.0124 | 6.6596 | 0.1158 | 6.7753 | 0.4616 | 1 | False |

In some embodiments, RNN model may correctly identify benign URLs composed of randomly distributed domain names with no apparent semantic meanings, such as 'v4dwkcv' and 'qlzn6i1l'. These domain names look like real DGAs and "fool" the n-gram model from a character perspective, as it is uncommon to accumulate considerable amount of bigram tokens like 'v4' or '6i' within the benign cases of the training set. RNN model can also decode the word-based DGA like "gentleshould." It learns the hidden representation of each word through LSTM. N-gram model fails to detect this underlying distribution since bi-gram features are disjoint. For a tree-based model, the encoded token values are primarily used for nodes split, with no correlations among characters learned throughout the training process.

In some embodiments, in decoding the Chinese Pinyin based domain names (e.g., xizanglvyou, laocaifengxitong), the RNN model tends to output a probability larger than 0.8, high enough to indicate that the LSTM does not generalize its good performance on other similar semantic based domains (e.g., gentleshould) to Pinyin based domains. As shown in FIG. 3A, the probability network model takes input from domain name, TLD, and domain length. Because "xizanglvyou.org" and "gentleshould.net" both use a commonly used TLD and have similar lengths, the most probable reason for causing the difference in prediction may be the output representation of the domain names. At each cell of the LSTM, the emitted hidden vector contains cell values of current input character with information of previous characters. To always obtain a representative vector that captures the underlying sequence pattern over hidden units, LSTM layers should be trained on a data set that contains enough input sequences with diversified distributions. The lack of training instances generated by some rarely used generation algorithms may lead to pool generalization of its LSTM-based model in real production system.

In some embodiments, the obtained domain comprises one or more Chinese Pinyin elements. Inadequate Chinese Pinyin based domain names in training domains increases the difficulty of benign domain identification through the disclosed probability network. For these cases, the disclosed n-gram model makes the right predictions based on their character bi-gram counts. Further, $w_2 > w_1$ ensures that predictions come from the n-gram model correct the predictions made by the RNN network, thereby improving the robustness of the disclosed detection model on those Pinyin based URLs.

Figure 3D:
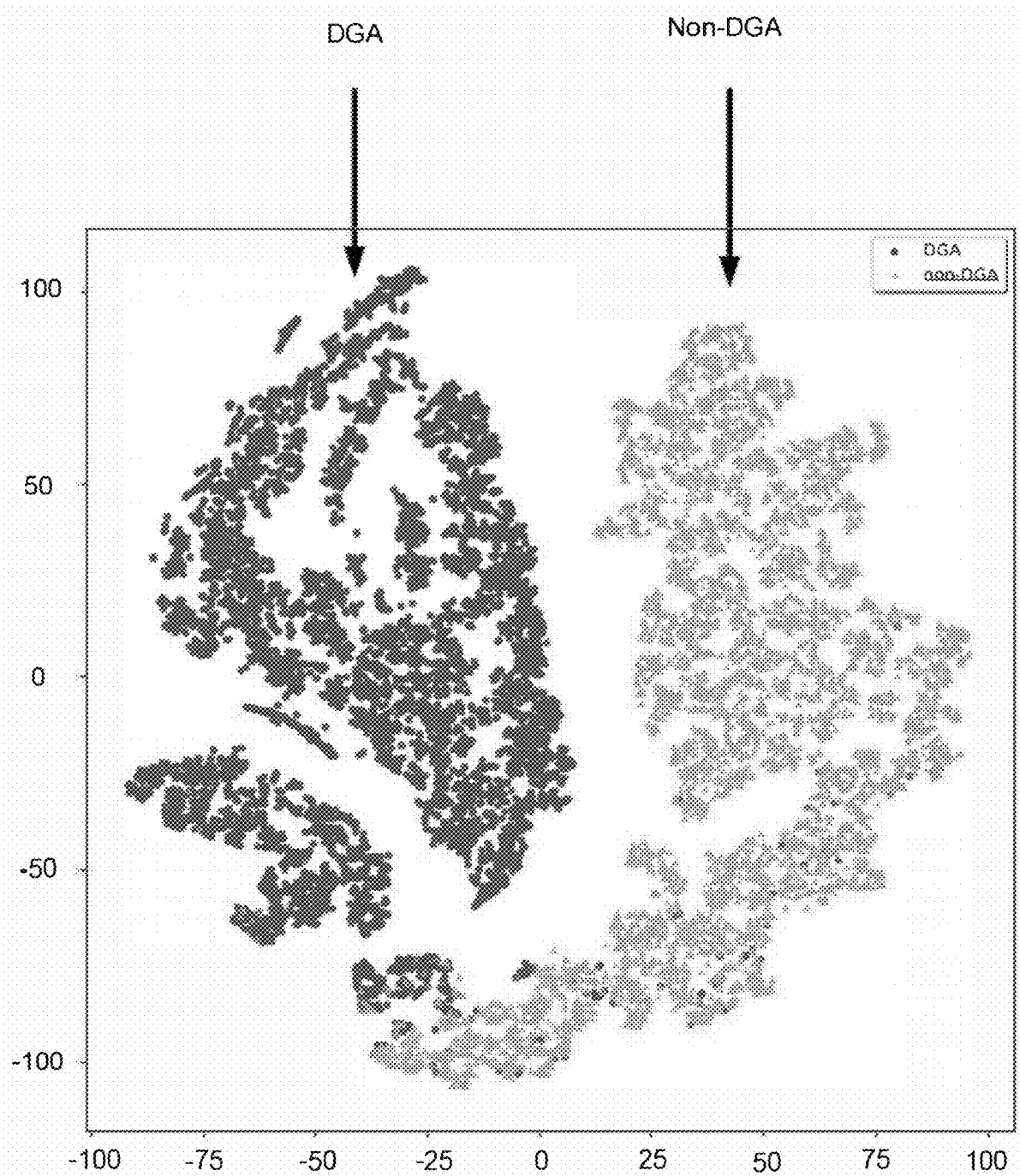
FIG. 3D illustrates a t-Distributed Stochastic Neighbor Embedding (t-SNE) embedding over representation vectors output from Gated Recurrent Unit (GRU) based representation network, in accordance with various embodiments.

FIG. 3D shows a 2-dimensional visualization of representation network output for selected test data using t-Distributed Stochastic Neighbor Embedding (t-SNE), in accordance with various embodiments. Overall, the representation network successfully creates low-dimensional representations of the test domains that are easy to separate and classify. Most benign and malicious cases clearly form its own cluster except for some cases in the lower portion of the graph. This explains why ensemble-representation model obtains a very close performance to ensemble-probability model. Consistent with the initial design of the representation network as a much lighter-weight model compared to the probability network, the training time of the representation network is only 1/10 of training time of the probability network using the same machine. For situations where computation power or time frame is limited, ensemble-representation model may be used for better efficiency-performance trade-off.

In some embodiments, according to Table 2, most extra features have relatively small coefficients after training, and indeed for most of test cases, the predicted label is mostly determined by RNN-based model output(s) and n-gram-based model.

As described, two types of deep neural network models are disclosed, one for DGA probability prediction and one for DGA condensed representation. Together with n-gram-based machine learning model for DGA classification and extra lexical features, a detection model that combines the advantages of the n-gram-based model, the assistive lexical features, and the full-string based model (the deep neural network models) are further disclosed, while alleviating the disadvantage of each individual component when used separately. As a result, the LSTM based probability network outperforms the existing models by almost one percent in both precision and recall. Further, the detection model reaches even greater performance when compared to a stand-alone n-gram-based model and a stand-alone RNN-based model. Further, because either the full-string based deep learning model or the n-gram-based model may not be able to capture all DGAs, as DGA is versatile and the task is complex, the disclosed detection model may balance the two types of models.

FIG. 4A illustrates a flowchart of an exemplary method 400, according to various embodiments of the present disclosure. The method 400 may be implemented, for example, the environment 100 of FIG. 1. The exemplary method 400 may be implemented by one or more components of the system 102. The exemplary method 400 may be implemented by multiple systems similar to the system 102. The operations of method 400 presented below are intended to be illustrative. Depending on the implementation, the exemplary method 400 may include additional, fewer, or alternative steps performed in various orders or in parallel.

Block 401 comprises obtaining, by a computing device, a domain. Optionally, block 401 comprises block 401a:

obtaining, by the computing device, the domain from a log of a local Domain Name Service (DNS) server. Block 402 comprises inputting, by the computing device, the obtained domain to a trained detection model to determine if the obtained domain was generated by one or more domain generation algorithms. The detection model comprises a neural network model, a n-gram-based machine learning model, and an ensemble layer. Inputting the obtained domain to the detection model comprises inputting the obtained domain to each of the neural network model and the n-gram-based machine learning model. The neural network model and the n-gram-based machine learning model both output to the ensemble layer. The ensemble layer outputs a probability that the obtained domain was generated by the domain generation algorithms. Optional block 403*a* comprises forwarding, by the computing device, the determination to the local DNS server to block queries of the domain.

FIG. 4B illustrates a flowchart of an exemplary method 410, according to various embodiments of the present disclosure. The method 410 may be implemented, for example, the environment 100 of FIG. 1. The exemplary method 410 may be implemented by one or more components of the system 102. The exemplary method 410 may be implemented by multiple systems similar to the system 102. The operations of method 410 presented below are intended to be illustrative. Depending on the implementation, the exemplary method 410 may include additional, fewer, or alternative steps performed in various orders or in parallel.

Block 401 comprises obtaining, by a computing device, a domain. Optionally, block 401 comprises block 401*b*: obtaining, by the computing device, the domain from an agent software installed on a client device. Block 402 comprises inputting, by the computing device, the obtained domain to a trained detection model to determine if the obtained domain was generated by one or more domain generation algorithms. The detection model comprises a neural network model, a n-gram-based machine learning model, and an ensemble layer. Inputting the obtained domain to the detection model comprises inputting the obtained domain to each of the neural network model and the n-gram-based machine learning model. The neural network model and the n-gram-based machine learning model both output to the ensemble layer. The ensemble layer outputs a probability that the obtained domain was generated by the domain generation algorithms. Optional block 403*b* comprises forwarding, by the computing device, the determination to the agent software to block communications with an Internet Protocol (IP) address of the domain.

FIG. 4C illustrates a flowchart of an exemplary method 420, according to various embodiments of the present disclosure. The method 420 may be implemented, for example, the environment 100 of FIG. 1. The exemplary method 420 may be implemented by one or more components of the system 102. The exemplary method 420 may be implemented by multiple systems similar to the system 102. The operations of method 420 presented below are intended to be illustrative. Depending on the implementation, the exemplary method 420 may include additional, fewer, or alternative steps performed in various orders or in parallel.

Block 401 comprises obtaining, by a computing device, a domain. Optionally, block 401 comprises block 401*c*: obtaining, by the computing device, the domain from a log of a network monitoring server. Block 402 comprises inputting, by the computing device, the obtained domain to a trained detection model to determine if the obtained domain was generated by one or more domain generation algorithms. The detection model (described above with reference to FIG. 3C) comprises a neural network model, a n-gram-based machine learning model, and an ensemble layer. Inputting the obtained domain to the detection model comprises inputting the obtained domain to each of the neural network model and the n-gram-based machine learning model. The neural network model and the n-gram-based machine learning model both output to the ensemble layer. The ensemble layer outputs a probability that the obtained domain was generated by the domain generation algorithms. Optional block 403*c* comprises forwarding, by the computing device, the determination to the network monitoring server to block queries of the domain.

Referring to methods 400, 410, and 420, in some embodiments, the detection model (described above with reference to FIG. 3C) comprises an extra feature layer, inputting the obtained domain to the detection model comprises inputting the obtained domain to the extra feature layer, the extra feature layer outputs to the ensemble layer, the domain is associated with a domain name and a top-level domain (TLD), and the extra feature layer comprises at least of the following features: a length of the domain name, a length of the TLD, whether the length of the domain name exceeds a domain name threshold, whether the length of the TLD exceeds a TLD threshold, a number of numerical characters in the domain name, whether the TLD contains any numerical character, a number of special characters contained in the domain name, or whether the TLD contains any special character.

In some embodiments, the ensemble layer comprises a top logistic regression model outputting the probability, the top logistic regression model comprises a plurality of ensemble coefficients respectively associated with the features, the output from the neural network model, and the output from the n-gram-based machine learning model, and the detection model is trained by: training the neural network model and the n-gram-based machine learning model separately, and inputting outputs of the trained neural network model and the trained n-gram-based machine learning model to the top logistic regression model to solve the ensemble coefficients.

In some embodiments, the neural network model comprises a probability network (described above with reference to FIG. 3A), the domain is associated with a domain name, a top-level domain (TLD), and a domain length as separate inputs to the probability network, the domain name is inputted to a one-hot encoding layer and a recurrent neural network layer, before being inputted to a dense and batch normalization layer, the TLD is inputted to an embedding and batch normalization layer, before being inputted to the dense and batch normalization layer, the domain length is inputted to the dense and batch normalization layer, and the dense and batch normalization layer outputs a predicted probability that the obtained domain was generated by the domain generation algorithms. In one example, the recurrent neural network layer comprises long-short term memory (LSTM) units.

In some embodiments, the neural network model comprises a representation network (described above with reference to FIG. 3B), the domain is associated with a domain name and a top-level domain (TLD) as separate inputs to the representation network, the domain name is inputted to an embedding and batch normalization layer and a recurrent neural network layer, before being inputted to a dense and batch normalization layer, the TLD is inputted to an embedding and batch normalization layer, before being inputted to the dense and batch normalization layer, and the dense and batch normalization layer outputs a dense representation of the domain. In one example, the recurrent neural network layer comprises gated recurrent units (GRU).

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
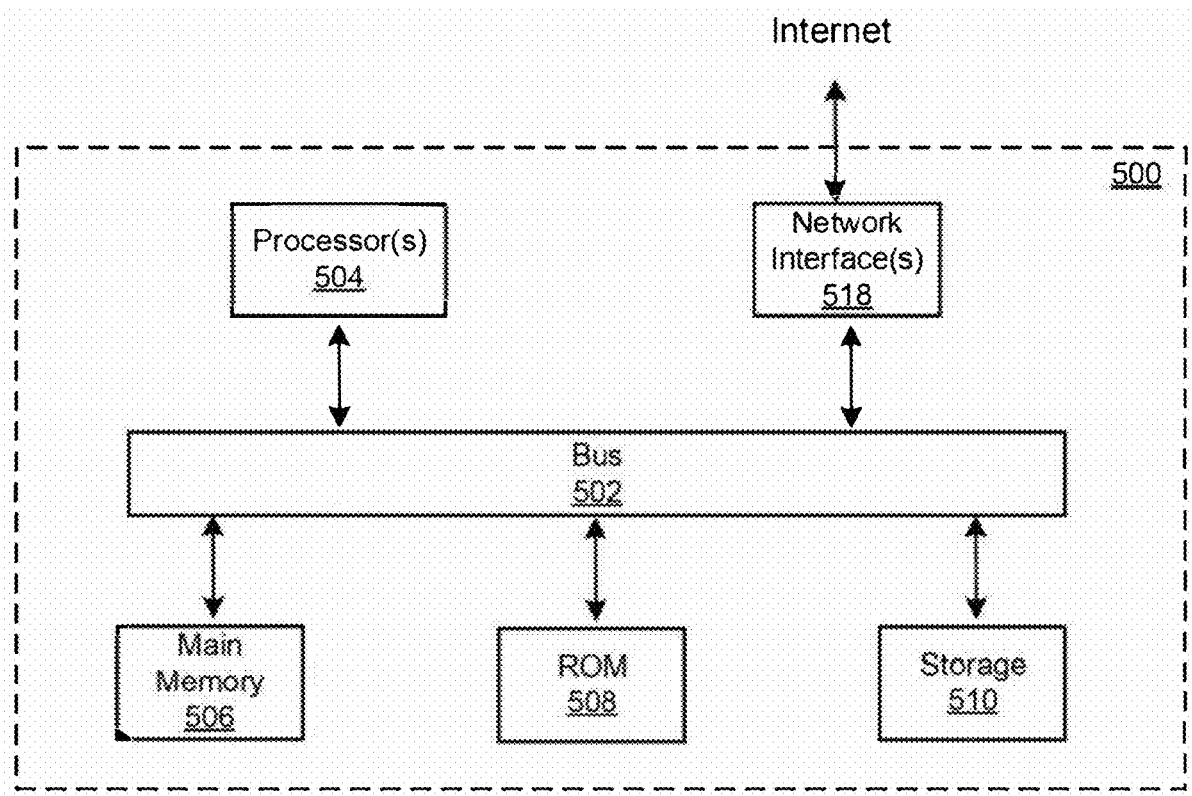
FIG. 5 illustrates a block diagram of an exemplary computer system in which any of the embodiments described herein may be implemented.

FIG. 5 is a block diagram that illustrates a computer system 500 upon which any of the embodiments described herein may be implemented. The system 500 may correspond to the system 102 or 103 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the operations, methods, and processes described herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to a media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a network interface 518 coupled to bus 502. Network interface 518 provides a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A computer-implemented method for training a detection model, comprising:
   training each of a neural network model and a n-gram-based machine learning model;
   generating a plurality of ensemble coefficients of an ensemble layer by inputting a plurality of outputs of both the trained neural network model and the trained n-gram-based machine learning model to the ensemble layer; and
   obtaining a trained detection model comprising the trained neural network model, the trained n-gram-based machine learning model, and the ensemble layer with the plurality of ensemble coefficients.

2. The method of claim 1, wherein training each of the neural network model and the n-gram-based machine learning model comprises:

obtain training data comprising benign and generated domains; and training each of the neural network model and the n-gram-based machine learning model based on the training data.

3. The method of claim 1, wherein the n-gram-based machine learning model comprises a gradient boosting based classifier trained based on n-gram features extracted from a training set.

4. The method of claim 1, wherein:

the trained detection model comprises an extra feature layer;

the extra feature layer outputs to the ensemble layer; and the extra feature layer comprises at least one of the following features: a length of an input domain name, a length of a top-level domain (TLD), whether the length of the input domain name exceeds a domain name threshold, whether the length of the TLD exceeds a TLD threshold, a number of numerical characters in the input domain name, whether the TLD contains any numerical character, a number of special characters contained in the input domain name, and whether the TLD contains any special character.

5. The method of claim 1, wherein:

the ensemble layer comprises a top logistic regression model; and generating the plurality of ensemble coefficients of the ensemble layer comprises solving the plurality of ensemble coefficients by inputting outputs of the trained neural network model and the trained n-gram-based machine learning model into the top logistic regression model.

6. The method of claim 1, wherein:

the neural network model comprises a probability network, wherein the probability network comprises:

a dense and batch normalization layer configured to output a predicted probability;

a one-hot encoding layer configured to receive a first input of the probability network and couple to a recurrent neural network layer, the recurrent neural network layer coupled to the dense and batch normalization layer; and an embedding and batch normalization layer configured to receive a second input of the probability network and couple to the dense and batch normalization layer.

7. The method of claim 6, wherein:

the recurrent neural network layer comprises long-short term memory (LS TM) units.

8. The method of claim 1, wherein:

the neural network model comprises a representation network, wherein the representation network comprises:

a dense and batch normalization layer configured to output a dense representation;

an embedding and batch normalization layer configured to receive a first input of the representation network and couple to a recurrent neural network layer, the recurrent neural network layer coupled to the dense and batch normalization layer; and an embedding and batch normalization layer configured to receive a second input of the representation network and couple to the dense and batch normalization layer.

9. The method of claim 8, wherein:

the recurrent neural network layer comprises gated recurrent units (GRUs).

10. The method of claim 1, wherein:

the n-gram-based machine learning model comprises a gradient boosting based classifier based on bigram features.

11. The method of claim 1, further comprising:

inputting a domain to the trained detection model; and outputting from the trained detection model a probability that the domain was generated by a domain generation algorithm.

12. The method of claim 11, wherein inputting the obtained domain to the trained detection model comprises inputting the obtained domain to each of the neural network model and the n-gram-based machine learning model to obtain the plurality of outputs of both the trained neural network model and the trained n-gram-based machine learning model.

13. A system comprising a processor and a non-transitory computer-readable memory storing instructions that, when executed by the processor, cause the processor to perform operations comprising:

training each of a neural network model and a n-gram-based machine learning model;

generating a plurality of ensemble coefficients of an ensemble layer by inputting a plurality of outputs of both the trained neural network model and the trained n-gram-based machine learning model to the ensemble layer; and obtaining a trained detection model comprising the trained neural network model, the trained n-gram-based machine learning model, and the ensemble layer with the plurality of ensemble coefficients.

14. The system of claim 13, wherein training each of the neural network model and the n-gram-based machine learning model comprises:

obtain training data comprising benign and generated domains; and training each of the neural network model and the n-gram-based machine learning model based on the training data.

15. The system of claim 13, wherein the n-gram-based machine learning model comprises a gradient boosting based classifier trained based on n-gram features extracted from a training set.

16. The system of claim 13, wherein:

the ensemble layer comprises a top logistic regression model; and generating the plurality of ensemble coefficients of the ensemble layer comprises solving the plurality of ensemble coefficients by inputting outputs of the trained neural network model and the trained n-gram-based machine learning model into the top logistic regression model.

17. The system of claim 13, wherein the operations further comprise:

inputting a domain to the trained detection model; and outputting from the trained detection model a probability that the domain was generated by a domain generation algorithm.

18. The system of claim 17, wherein inputting the obtained domain to the trained detection model comprises inputting the obtained domain to each of the neural network model and the n-gram-based machine learning model to obtain the plurality of outputs of both the trained neural network model and the trained n-gram-based machine learning model.

19. A non-transitory computer-readable storage medium storing instructions that, when executed by a processor, cause the processor to perform operations comprising:
- training each of a neural network model and a n-gram-based machine learning model;
- generating a plurality of ensemble coefficients of an ensemble layer by inputting a plurality of outputs of both the trained neural network model and the trained n-gram-based machine learning model to the ensemble layer; and
- obtaining a trained detection model comprising the trained neural network model, the trained n-gram-based machine learning model, and the ensemble layer with the plurality of ensemble coefficients.

20. The non-transitory computer-readable storage medium of claim 19, wherein the operations further comprise:
- inputting a domain to the trained detection model; and
- outputting from the trained detection model a probability that the domain was generated by a domain generation algorithm.

* * * * *